US005764394A

United States Patent [19]
Yamazaki et al.

[11] Patent Number: 5,764,394
[45] Date of Patent: Jun. 9, 1998

[54] INTERFACE DEVICE

[75] Inventors: Shuntaro Yamazaki; Takayuki Nyu; Morihisa Momona, all of Tokyo; Mitsuru Tachibana, Kanagawa, all of Japan

[73] Assignee: NEC Corporation, Tokyo, Japan

[21] Appl. No.: 623,535

[22] Filed: Mar. 29, 1996

[30] Foreign Application Priority Data

Mar. 29, 1995 [JP] Japan ................................ 7-070272

[51] Int. Cl.⁶ ........................................ H04B 10/00
[52] U.S. Cl. ......................... 359/152; 359/118; 359/174
[58] Field of Search ............................. 359/113, 118, 359/152, 158, 174, 179, 181; 375/257

[56] References Cited

U.S. PATENT DOCUMENTS

| | | |
|---|---|---|
| 4,249,266 | 2/1981 | Makamori .................... 359/152 |
| 4,654,844 | 3/1987 | Maudello ..................... 359/113 |
| 4,736,385 | 4/1988 | Pratt et al. .................... 375/257 |
| 5,243,623 | 9/1993 | Murdock ...................... 375/257 |
| 5,390,038 | 2/1995 | Cecchini ...................... 359/118 |
| 5,467,061 | 11/1995 | Aden et al. ................... 375/257 |

*Primary Examiner*—Wellington Chin
*Attorney, Agent, or Firm*—Sughrue, Mion, Zinn, Macpeak & Seas, PLLC

[57] ABSTRACT

An interface device includes a transmission level converting circuit for converting a differential amplitude voltage of different signs, output from an IC for a transmission line driving circuit pursuant to IEEE 802.3 10 Base T, into an output voltage of a single pole code. The interface device also includes a reception level conversion circuit for converting a voltage of a single pole code into a differential amplitude voltage of different signs to an IC for driving a transmission line driving circuit, and an optical transceiver to which the single pole code voltage is input and output. A transmission line driving circuit is provided to enable connection to an optical fiber via the optical transceiver.

11 Claims, 10 Drawing Sheets

FIG.12 PRIOR ART

INTERFACE DEVICE

BACKGROUND OF THE INVENTION

1. Field of the Invention

The present invention relates generally to an interface device. More specifically, the invention relates to an interface device establishing a physical interface between an optical fiber transmission path and a transmission path driving circuit to be employed in an optical Local Area Network (LAN).

2. Description of the Related Art

LAN system having a transmission ratio of 10 Mb/s is a widely spread LAN system. A LAN system pursuant to 10 Base T defined in IEEE 802.3 employing a twisted pair cable in the transmission line is inexpensive and is abruptly spreading in the recent years.

Figure 9:
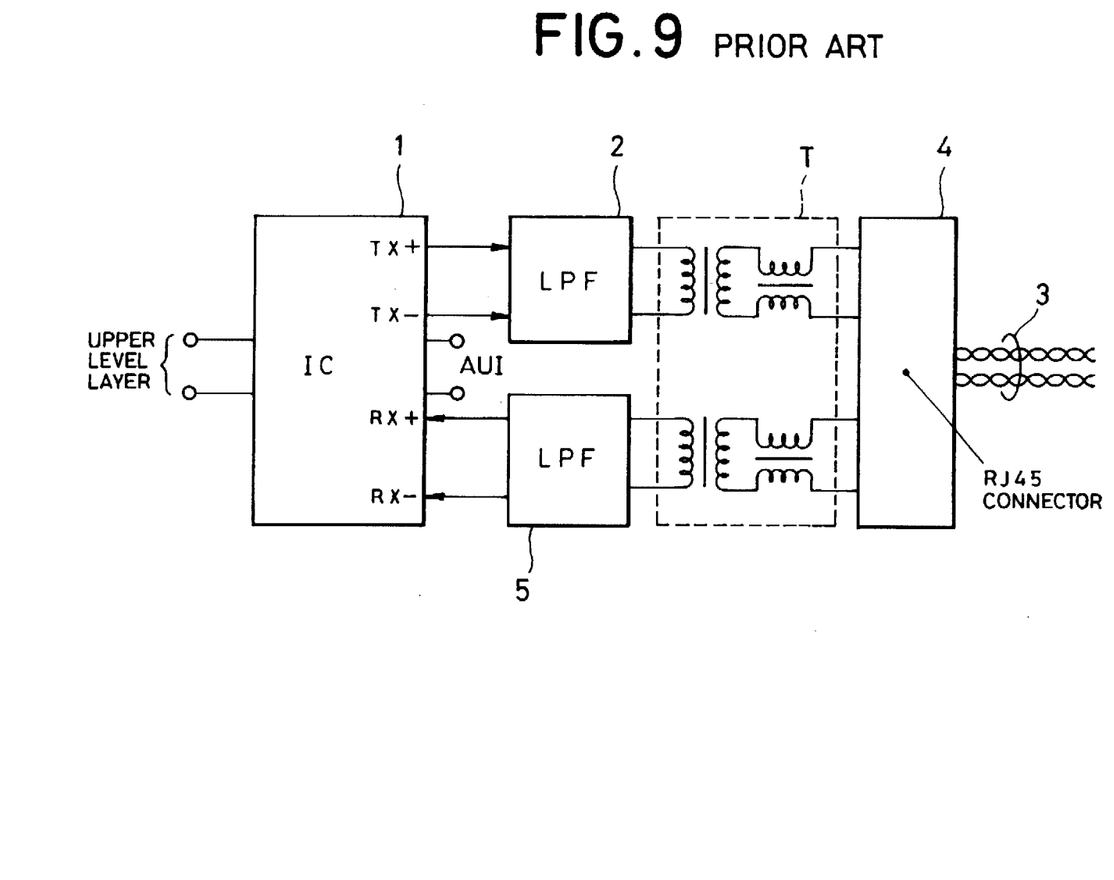
FIG. 9 is an illustration showing one embodiment of the conventional interface device.

In such LAN system, a twisted pair cable is employed. In this case, a filter for eliminating noise due to electromagnetic radiation is inherent. FIG. 9 shows a construction of the LAN system. The construction shown in FIG. 9 is established pursuant to IEEE 802.3 10 Base T standard shown in FIG. 10.

Figure 10:
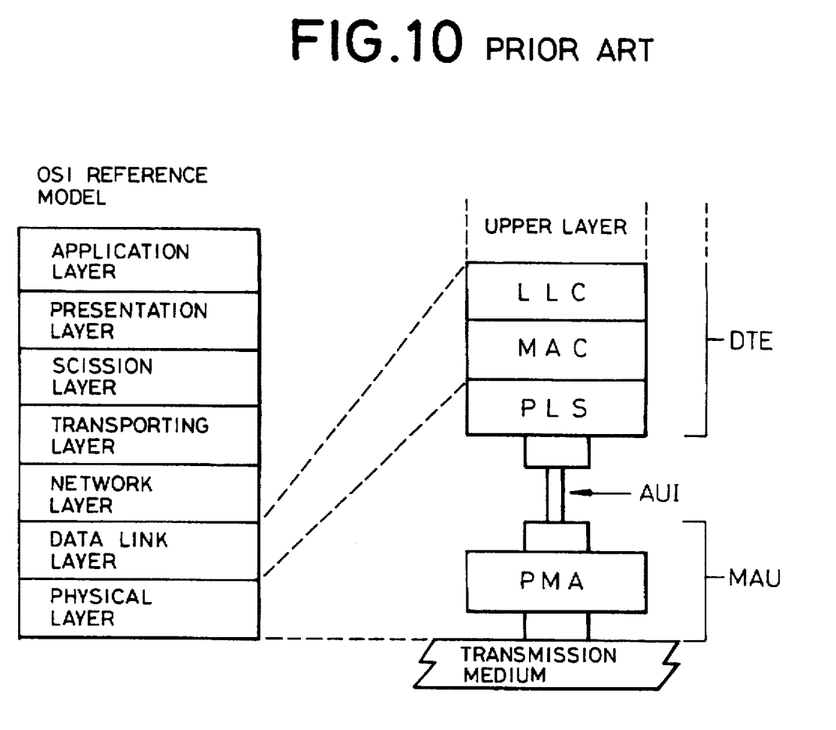
FIG. 10 is an illustration showing a protocol stack of IEEE 802.3 10 Base T standard.

In FIG. 10, LLC is logical link control sublayer, MAC is media access control sublayer, PLS is physical signalling sublayer, AUI is an attachment unit interface, PMA is a physical media attachment sublayer. Also, DTE is a data terminal.

Referring to FIG. 9, an integrated circuit (IC) 1 as a transmission line driving circuit integrates all of LLC layer, MAC layer, PLS layer and PMA layer to output a Manchester coded signal. High frequency components of the Manchester coded signal are removed by a low-pass filter (LPF) 2 and transmitted by the twisted pair cable 3 connected to RJ45 type connector 4 via a transformer T.

A transmission signal from the twisted pair cable 3 is input to the transformer T via the RJ45 type connector 4. A signal passed through the transformer T has any noise components removed by the LPF 5 and subsequently input to the IC 1 to be converted into NRZI code to be fed to an upper-level layer (see FIG. 10).

It should be noted that the IC 1 is normally constructed to provide the AUI (attachment unit interface).

Figure 11:
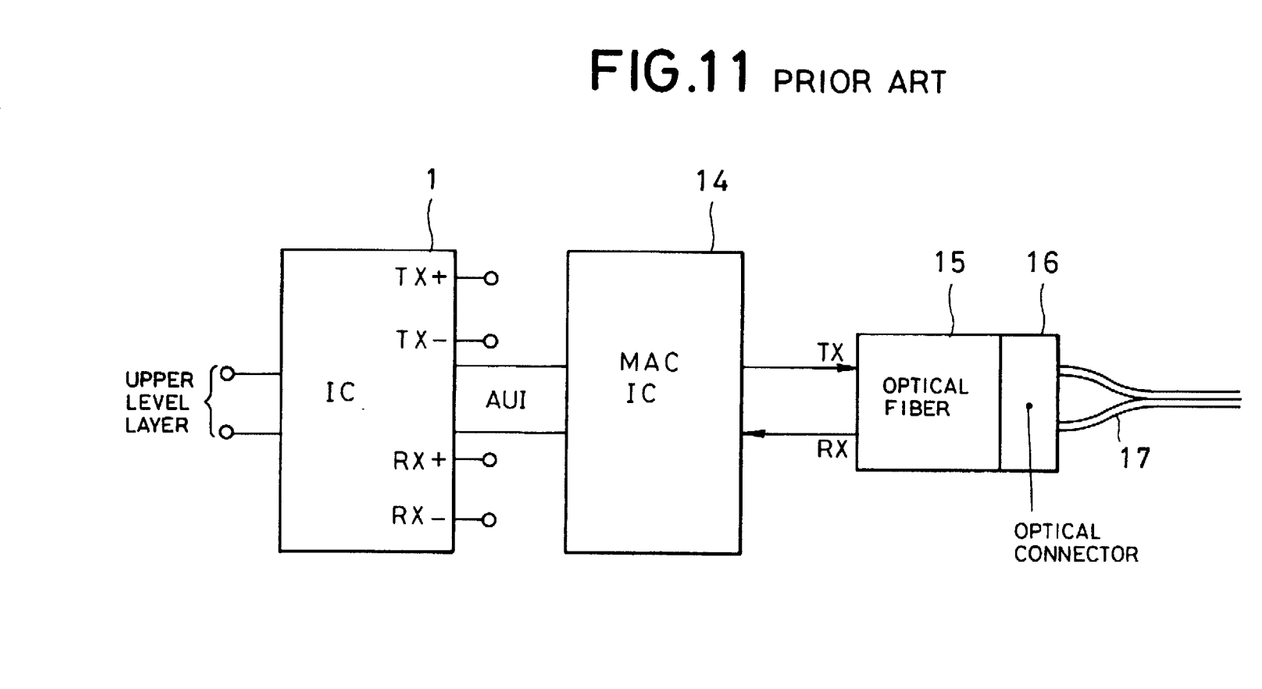
FIG. 11 is an illustration showing another example of the conventional interface device.

There is a construction to newly connect a second IC 14 for media attachment unit (MAU) to the attachment unit interface (AUI) of the IC 1 and to connect that of the IC 1 to an optical transceiver 15 via the IC 14 for MAU to establish interface with an optical fiber, as shown in FIG. 11, in place of the transformer T and LPFs 2, 5 shown in FIG. 9. This system is an optical interface based on IEEE 802.3 10 Base FL standard.

In the system employing the twisted pair cable shown in FIG. 9, the transformer and LPFs 2, 5 are inherently required. But it is difficult to lower the cost for these elements, so it is disadvantgeous to employ them in term of the cost. In the system employing the optical fiber as shown in FIG. 11, while transformer, LPFs and so forth are not required, it is required to employ the IC 14 for MAU, which is expensive. Therefore, due to the cost required for IC 14, the system employing the optical interface cannot lower the cost than that of the system employing the twisted pair cable shown in FIG. 9.

SUMMARY OF THE INVENTION

Therefore, it is an object of the present invention to provide an interface device which can realize lower cost than a twisted pair transmission system.

According to one aspect of the invention, an interface device establishing a physical interface between an optical fiber transmission line and a transmission line driving circuit comprises:

an optical transceiver integrating an optical transmission circuit, an optical receiving circuit and an optical connector; and level conversion means for converting respective of levels of input and output electrical signals of the optical transceiver, respectively.

The optical transceiver has an electrical interface of a TTL signal, and the level converting means includes a transmission level converting circuit for converting an output signal level of the transmission line driving circuit into the TTL signal level and a reception level converting circuit for converting the TTL signal output level of the optical transceiver into an input signal level of the transmission line driving circuit. In the alternative, the optical transceiver has an electrical interface of a pseudo ECL signal level and the level converting means includes a transmission level converting circuit for converting an output signal level of the transmission line driving circuit into a pseudo ECL signal level and a reception level converting circuit for converting the pseudo ECL signal output level of the optical transceiver into an input signal level of the transmission line driving circuit.

The interface device may be a physical interface for a Ethernet type local area network, and the transmission line driving circuit may be an interface with a twisted pair optical transmission line pursuant 10 Base T defined in IEEE 802.3. The optical transceiver may have an electrical interface of a TTL signal, and the level converting means may include a transmission level converting circuit for converting a differential output voltage of different sign output voltages of the transmission line driving circuit into the TTL signal level and a reception level converting circuit for converting the TTL signal output level of the optical transceiver into a differential output voltage of different sign output voltages of the transmission line driving circuit. Alternatively, the optical transceiver may have an electrical interface of a pseudo ECL signal level and the level converting means includes a transmission level converting circuit for converting a differential output voltage of different sign output voltages of the transmission line driving circuit into a pseudo ECL signal level and a reception level converting circuit for converting the pseudo ECL signal output level of the optical transceiver into a differential output voltage of different sign output voltages of the transmission line driving circuit.

According to another aspect of the invention, an interface device for a fast Ethernet type local area network system comprises:

an optical transceiver having an electrical interface of a pseudo ECL signal; and a transmission line driving circuit for inputting and outputting signals of pseudo ECL signal pursuant to 100 Base TX to and from the optical transceiver.

According to a further aspect of the invention, an interface device for a fast ethanet type local area network system comprises:

an optical transceiver having an electrical interface of a pseudo ECL signal; and a transmission line driving circuit for inputting and outputting signals of pseudo ECL signal pursuant to 10 Base T and 100 Base TX to and from the optical transceiver;

level conversion means for converting a differential output voltage of different signs of output voltages pursuant to 10 Base T; and selection means for selectively outputting the output of the level converting means or an output pursuant to 100 Base TX based in a selection signal from the transmission line driving circuit.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

The preferred embodiment of the present invention will be discussed hereinafter with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail to avoid obscuring the present invention.

Figure 1:
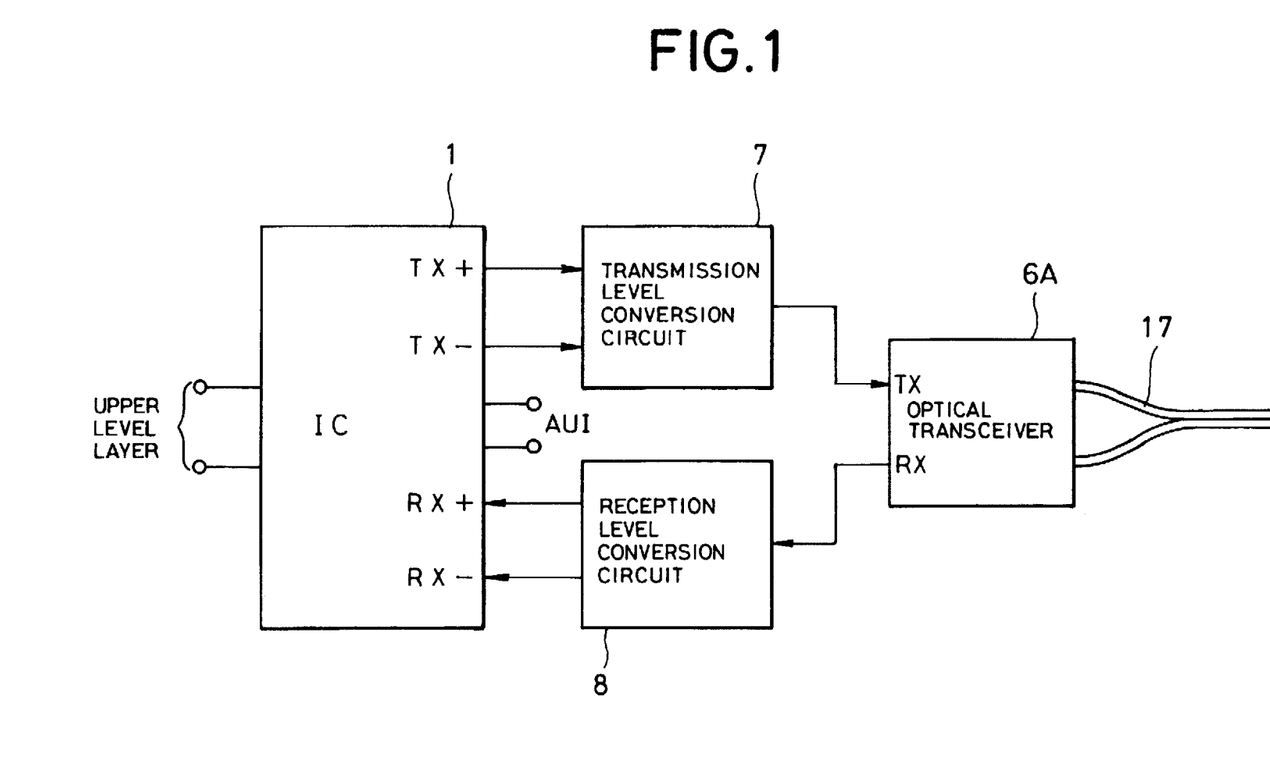
FIG. 1 is a block diagram showing one embodiment of the present invention.
Figure 12:
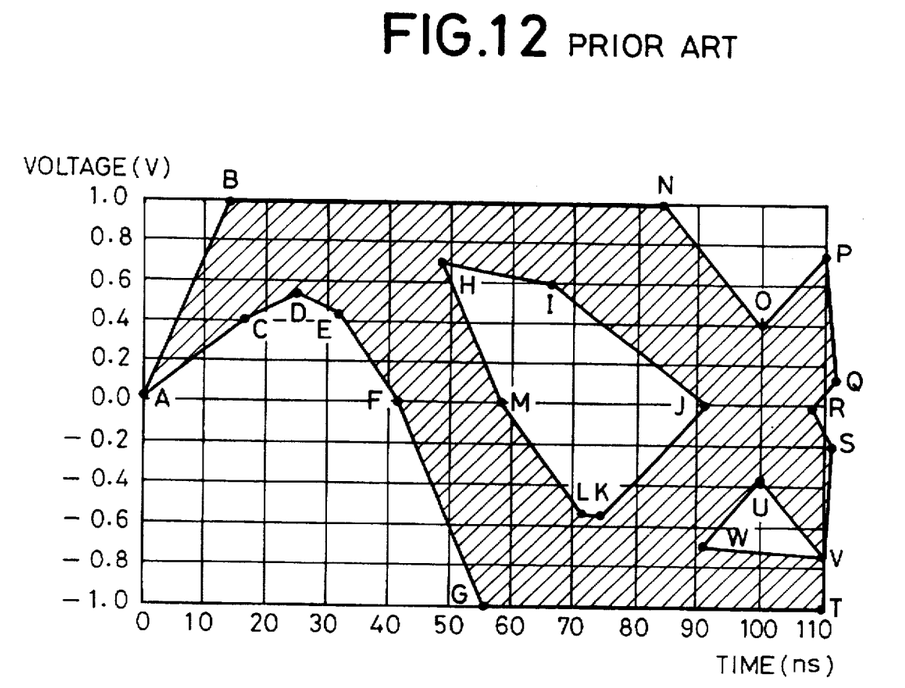
FIG. 12 is an illustration showing an eye mask definition of IEEE 802.3 10 Base T standard.

FIG. 1 is a block diagram showing one embodiment of the present invention, in which like portions to FIGS. 9 and 11 will be identified by like reference numerals. Referring to FIG. 1, the IC 1 pursuant to IEEE 802.3 10 Base T standard is the same as that of FIGS. 9 and 11. The transmission line driving IC 1 is mounting respective layer functions of LLC, MAC, PLS, PMA. A differential output signal output from the IC 1 is a Manchester code of 2.5 Vp-p (peak to peak) of differential amplitude adapted to an eye mask (shown by hatching) defined by IEEE 802.3 10 Base T, shown in FIG. 12.

A transmission level conversion circuit 7 converts a transmission output signal from the IC 1 into TTL (transistor-transistor logic) signal level to input to an optical transceiver 6A. The optical transceiver 6A has an optical interface including an electrical interface of TTL level, which has a known construction integrating LED driver of TTL input, LED (light emitting diode of 65 nm of wavelength, a silicon PIN PD (photodiode), a reception circuit of TTL output and a photo receptacle.

To the optical transceiver 6A, a two core plastic optical fiber 17 of less than or equal to 100 m in length is connected as a transmission line.

A reception signal by the optical transceiver 6A from the transmission line 17 becomes TTL level to be input to a reception signal level conversion circuit 8. In the reception signal level conversion circuit 8, the reception signal of TTL level is input to the IC 1 with converting into the Manchester code having amplitude of 2 Vp-p. The output signal of the IC 1 is set at 2.5 Vp-p which is higher than the input signal of the IC 1 at 2.0 Vp-p, for 0.5V in consideration of loss of the signal in the transmission line.

Figure 2:
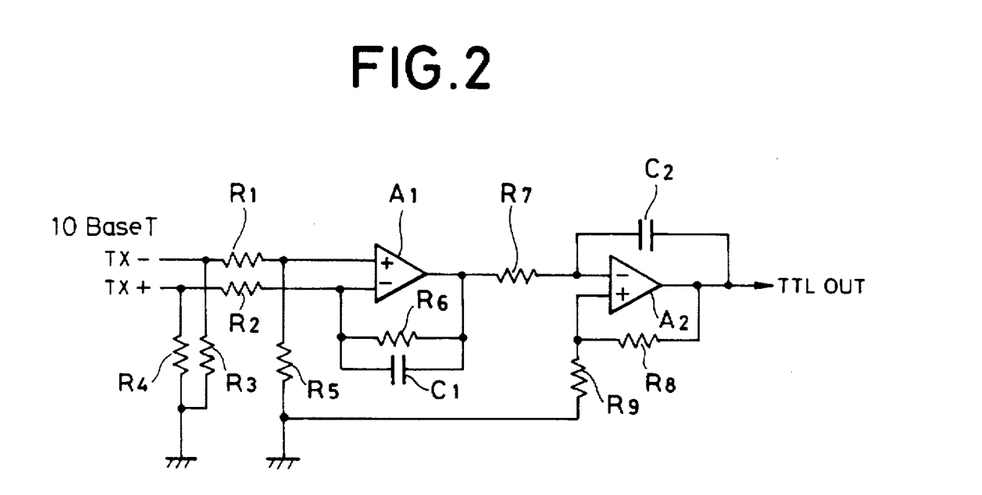
FIG. 2 is a circuit diagram showing an example of a transmission level conversion circuit in the block diagram of FIG. 1.
Figure 3:
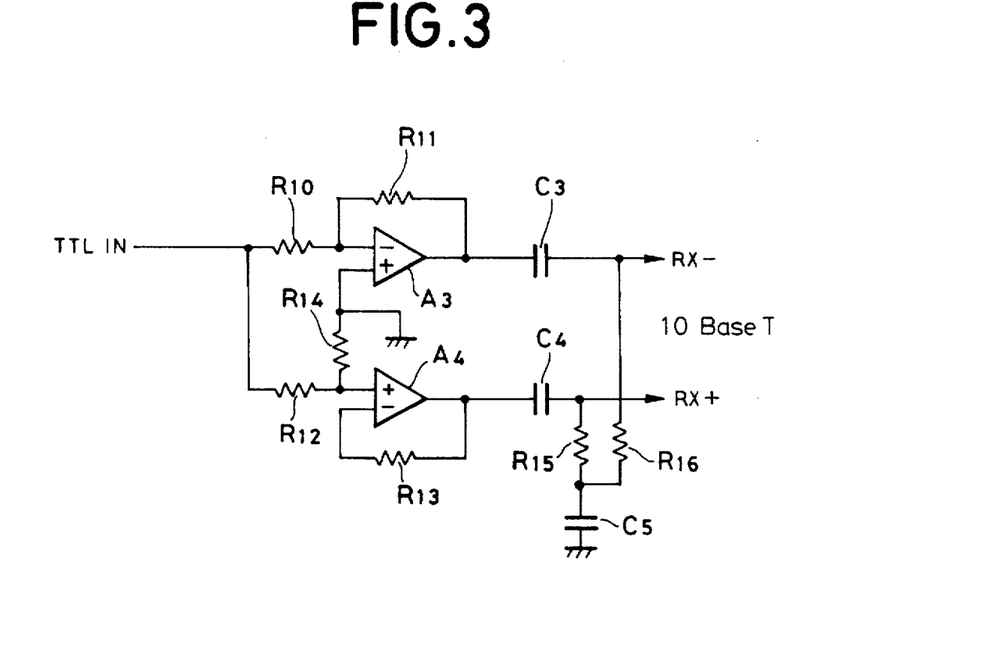
FIG. 3 is a circuit diagram showing an example of a reception level conversion circuit of the block diagram of FIG. 1.

FIG. 2 is a concrete example of the circuit diagram of a transmission level conversion circuit 7, and FIG. 3 is a concrete example of the circuit diagram of the reception level conversion circuit 8.

In FIG. 2, the input voltage of differential amplitude Tx$^-$ and Tx$^+$ (amplitude 2.5 Vp-p) of 10 Base T, is subtracted and amplified by a subtractor constituted of an operational amplifier A1, a resistor R6 and a capacitor C1. A subtraction output is supplied to a filter circuit of low pass function, which is constituted of an operational amplifier A2, a resistor R7, a capacitor C2 and resistors R8 and R9 to convert into a signal of a single pole having TTL level of approximately 5 Vp-p. It should be noted that resistors R1 to R5 are input bias resistor.

In FIG. 3, the single pole input signal of approximately 5 Vp-p of TTL level is input to an inverting amplifier constituted of an operational amplifier A3 and resistors R10 and R11. On the other hand, the input signal is input to a positive phase amplifier constituted of an operational amplifier A4 and resistors R12, R13 and R14. From these positive phase and inverted phase outputs, differential outputs Rx$^-$ and Rx$^+$ of the amplitude 2 Vp-p of 10 Base T are obtained via capacitors C3 and C4. It should be noted that resistors R15, R16 and capacitor C5 form a low pass filter.

Figure 4:
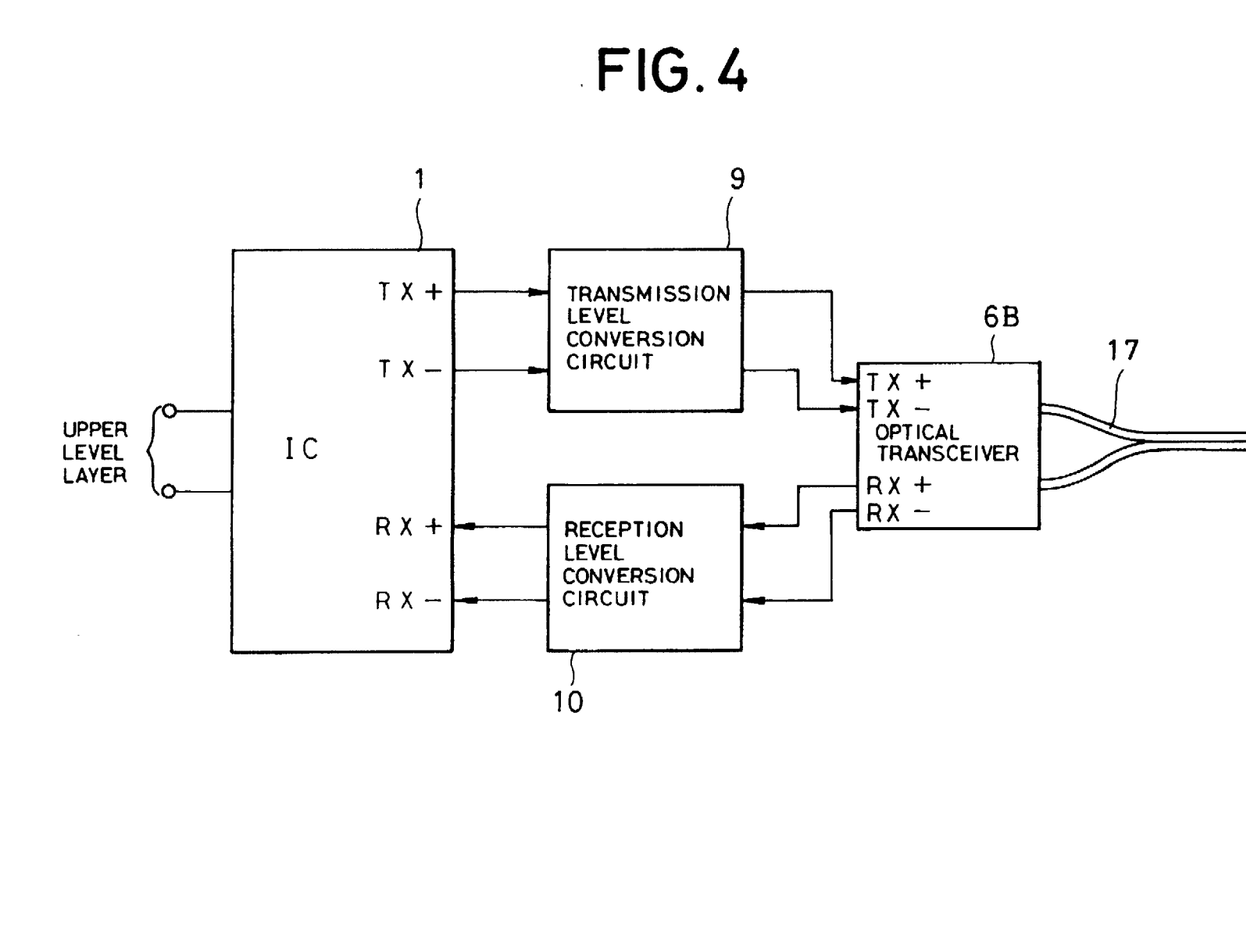
FIG. 4 is a block diagram of another embodiment of the invention.

FIG. 4 is a block diagram showing another embodiment of the present invention. The like portion to FIG. 1 will be identified by like reference numerals. In the shown embodiment, an optical transceiver 6B having a pseudo ECL (emitter coupled logic) level electrical interface function is employed.

The Manchester code as the differential output from the IC 1 is a signal having differential amplitude of 2.5 Vp-p adapted to the eye mask defined by 10 Base T of IEEE 802.3. This signal is converted into a signal of ECL level in the transmission level conversion circuit 9 and then input to the optical transceiver 6B. Then, the signal is fed to a plastic clad optical fiber 17.

The optical transceiver 6B has a known construction, in which an LED driver of pseudo ECL input, an LED having 650 nm of wavelength, a silicon PIN PD, a receiving circuit of ECL output and a photo receptacle are integrated.

To the optical transceiver 6B, the two core plastic clad optical fiber 17 is connected. The transmission signal from the optical fiber 17 is converted into the signal of pseudo ECL level by the optical transceiver 6B and then input to a reception level conversion circuit 10.

The signal of pseudo ECL level input to the reception level conversion circuit 10 is converted into the Manchester code having amplitude of 2 Vp-p and then input to the IC 1.

Figure 5:
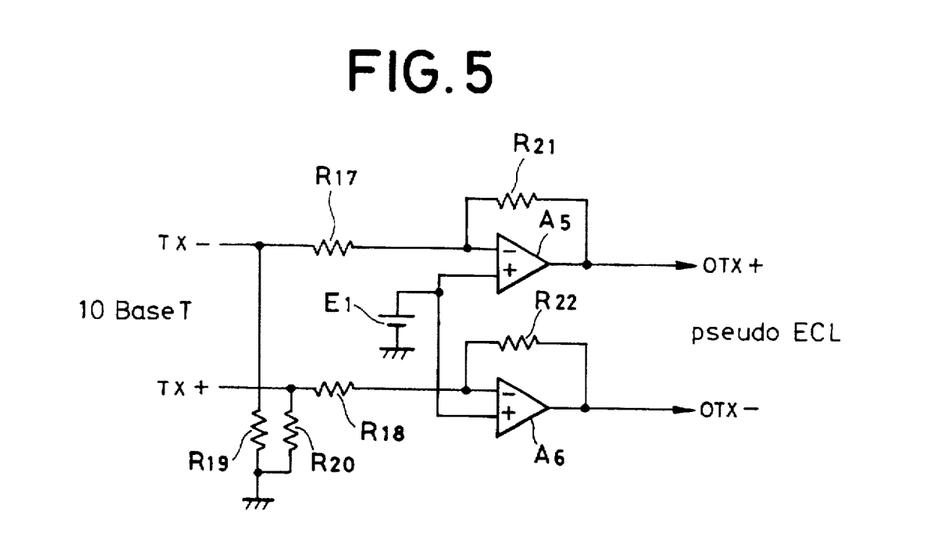
FIG. 5 is a circuit diagram showing an example of a transmission level conversion circuit in the block diagram of FIG. 4.
Figure 6:
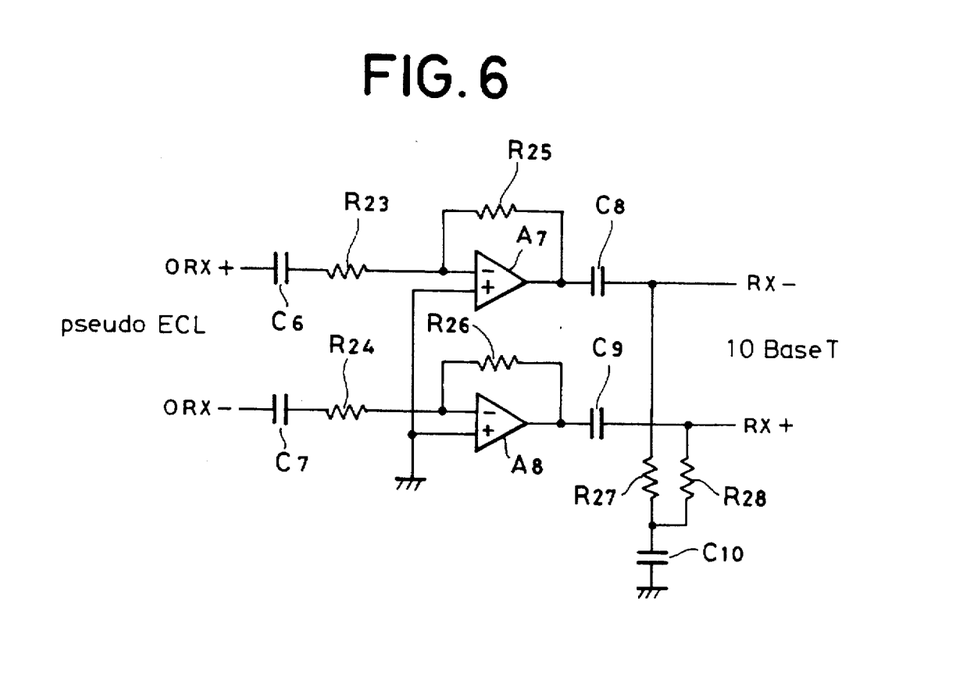
FIG. 6 is a circuit diagram showing an example of a reception level conversion circuit of the block diagram of FIG. 4.

FIG. 5 is a circuit diagram showing a concrete example of the transmission level conversion circuit 9 of FIG. 4. FIG. 6 is a circuit diagram showing a concrete example of a reception level conversion circuit 10.

In FIG. 5, a differential input of Tx$^-$ and Tx$^+$ of 10 Base T is supplied to respective of inverting amplifiers. Each of these inverting amplifiers is constituted of operational amplifiers A5 and A6, resistors R21 and 22 and a bias voltage E1. From respective outputs of these inverting amplifiers, the differential outputs OTx$^+$ and OTx$^-$ of pseudo ECL are obtained. It should be noted that the resistors R17 to R20 are input bias resistors.

While the pseudo ECL signal has an amplitude in the order of 0.6 to 0.8V similarly to the normal ECL signal, since the pull up potential of the signal line is set at 5V which is greater than the normal ECL signal, the pseudo ECL signal may differentiate the direct current potential to the normal ECL signal.

In FIG. 6, the pseudo ECL differential signal is supplied to respective inverting amplifiers via the capacitors C6 and C7 and the resistors R23 and R24. Each of these inverting amplifiers is constituted of operational amplifiers A7 and A8 and resistors R25 and R26. From the outputs of these, the differential signals Rx$^-$ and Rx$^-$ of 10 Based T are obtained through capacitors C8 and C9.

It should be noted that resistors R27 and R28 and capacitors C10 form a low-pass filter.

Figure 7:
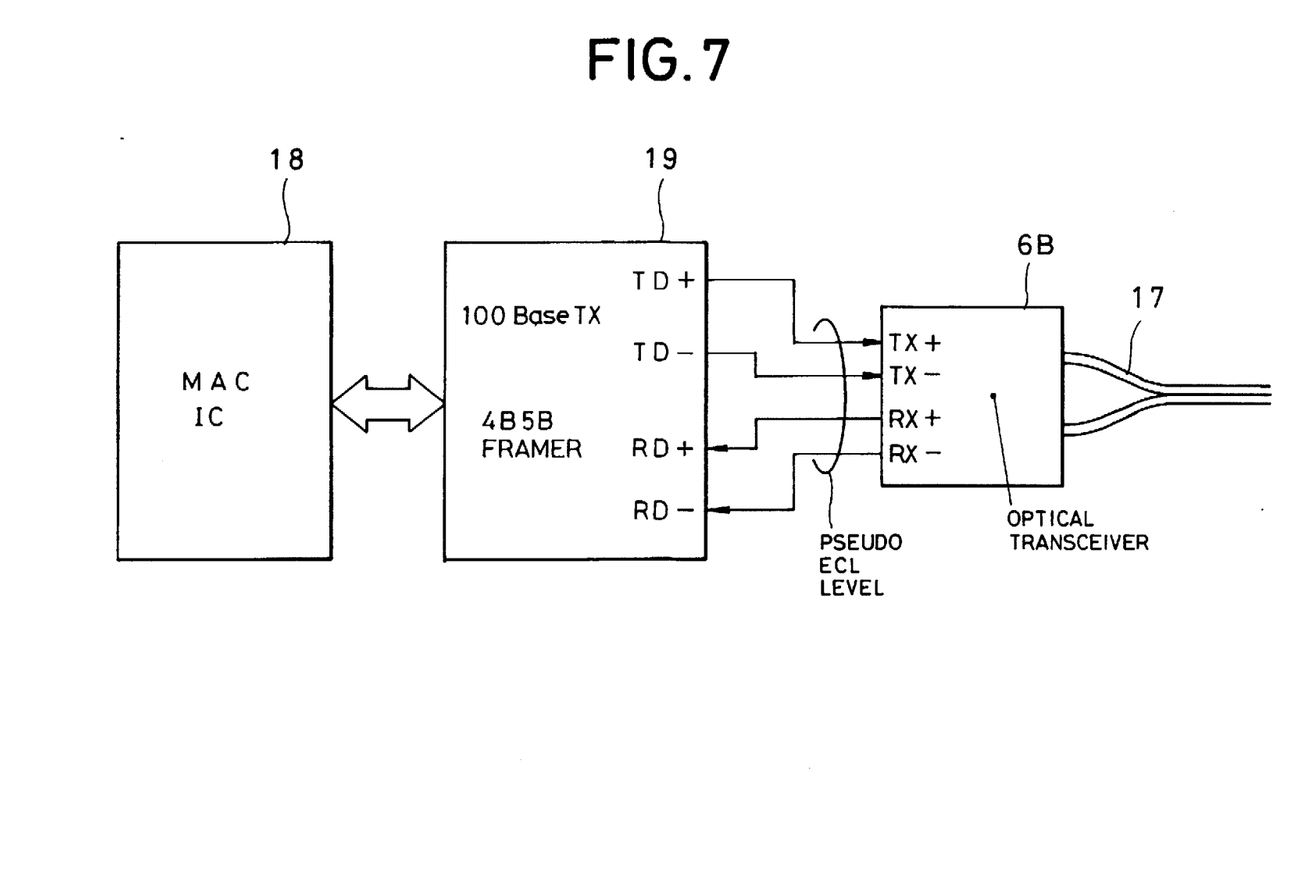
FIG. 7 is an illustration showing a modification of the embodiment according to the invention.

FIG. 7 is an illustration showing one modification of the present invention. For example, LAN system having a transmission ratio of 100 Mb/s has been standardized as IEEE 802.3 100 Base TX. FIG. 7 shows an application of the present invention for such LAN system.

In the 100 Base TX standard, a ternary code of MLT3 is employed for the twisted pair cable. Therefore, an IC for converting binary NRZ code into MTL3 is employed. In application of the present invention, MLT3 code conversion is not performed. Instead, 100 Mb/s of optical interface can be established by directly supplying the NRZ signal of pseudo ECL level output from 4B5B framer 19 (100 Base TX standard) to the transceiver 6B. It should be noted that MAC IC 18 is a control IC for the media access control (MAC) sublayer.

Figure 8:
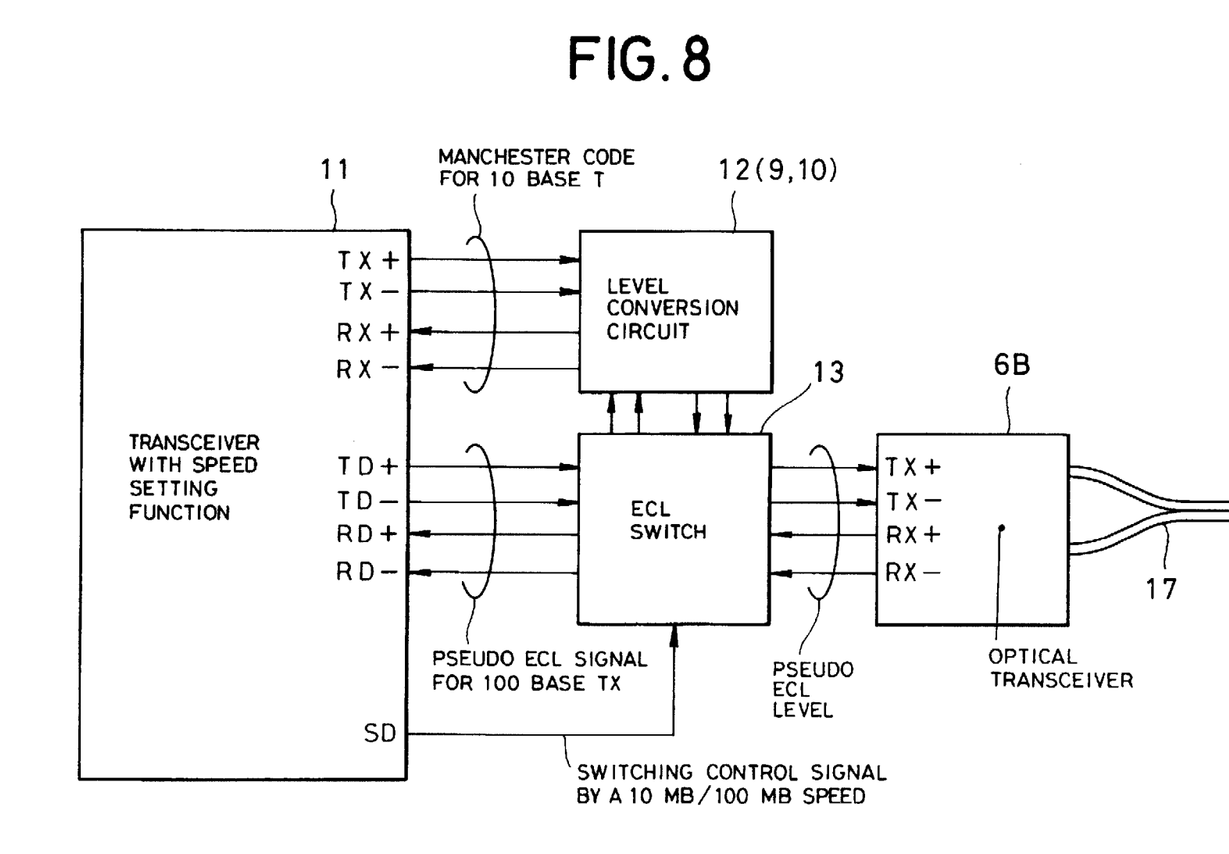
FIG. 8 is an illustration showing another modification of the embodiment according to the invention.

FIG. 8 is an illustration showing another modification of the present invention, in which the present invention is applied to a twisted pair transceiver 11 having speed detection switching function between 10 Mb/s and 100 Mb/s. The transceiver 11 with the speed detection switching function has an interface for the Manchester code for 10 Base T and an interface of the pseudo ECL signal for 100 Base TX.

In case of the Manchester code for 10 Base T, the level conversion circuit 12 (9, 10 of FIG. 4) and the optical transceiver 6B are connected by means of an ECL switch 13 to form the construction illustrated in FIG. 4. On the other hand, in case of the pseudo ECL signal for 100 Base TX, control is performed for directly connecting the optical transceiver 6B and the 100 Base Tx transceiver 11 by means of the ECL switch 13 to form the construction illustrated in FIG. 7.

It should be noted that the switching control of the ECL switch as set forth above, is performed by a switching control signal by a 10 Mb/100 Mb speed switching function in the 100 Base TX transceiver.

As set forth above, in the present invention, the optical transceiver and the transmission line driving circuit are connected via a circuit of quite simple construction and having level converting function. Cost can be lowered. Conventionally, the optical transceiver is more expensive than the twisted pair interface. However, by recent cost-down, especially the optical transceiver constituted of the plastic optical fibers is cheaper than the LPF 2, 5 or the transformer T of FIG. 9. Also, the transmission line per se is realized at equivalent or lower cost than the twisted pair cable.

Therefore, by taking the construction set forth above, the system can be constructed at lower cost than the 10 Base FL (FIG. 11) which requires MAU IC and 10 Base T (FIG. 9) requiring the LPF and transformer.

As set forth above, according to the present invention, connection between the optical transceiver and the transmission line driving circuit can be established only by employing the level conversion circuit of simple construction without employing the LPF and the transformer or extra IC for MAU. Therefore, the interface device can be obtained at quite low cost.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An interface device for establishing a physical interface between an optical fiber transmission line and a transmission line driving circuit, said device comprising:

an optical transceiver connected to said optical fiber transmission line, said optical transceiver having an electrical interface for a TTL signal, and a level conversion means for converting signal levels from said transmission line driving circuit to signal levels for an input of said optical transceiver and for converting signal levels output from said optical transceiver to signal levels for said transmission line driving circuit, said level conversion means including:

a transmission level converting circuit comprising: a subtractor for receiving a differential output signal of said transmission line driving circuit; and a low pass filter receiving the output of said subtractor to output a TTL signal to said optical transceiver; and a reception level converting circuit for converting the TTL signal output level of said optical transceiver to an input signal level of said transmission line driving circuit.

2. The interface device of claim 1, wherein said reception level converting circuit comprises:

an inverting amplifier receiving the TTL signal output from said optical transceiver; and a phase amplifier also receiving the TTL signal output from said optical transceiver, outputs of said inverting amplifier and said phase amplifier providing a differential input signal for said transmission line driving circuit.

3. The interface device of claim 2, wherein said subtractor circuit includes a first operational amplifier for receiving said differential signal, an output of said first operational amplifier connected with an inverting input of said first operational amplifier via a parallel connection of a first resistor and a first capacitor;

said low pass filter includes a second operational amplifier receiving the output of said first operational amplifier via a second resistor, an output of said second amplifier being connected with an inverting input of said second operational amplifier via a second capacitor and with a non-inverting input of said second operational amplifier via a third resistor;

said inverting amplifier includes a third operational amplifier receiving the TTL output of said optical transceiver through an inverting input of said third operational amplifier via a fourth resistor, an output of said third operational amplifier connected to the inverting input of the third operational amplifier, a non-inverting input of said third operational amplifier connected to ground; and said phase amplifier includes a fourth operational amplifier also receiving the TTL output of said optical transceiver through a non-inverting input via a fifth resistor, an output of said fourth operational amplifier connected to an inverting input of said fourth operational amplifier via a sixth resistor, wherein the outputs of said third and fourth operational amplifiers provide said differential input to said transmission line driving circuit.

4. An interface device for a local area network system, said device comprising:

an optical transceiver having an electrical interface for a pseudo ECL signal;

a transmission line driving circuit operable to input and output signals of a pseudo ECL signal in accordance with 10 Base T and 100 Base TX as defined in IEEE standard 802.3;

level conversion means for converting a differential output voltage of varying sign in accordance with 10 Base T output from said transmission line driving circuit into a voltage of a pseudo ECL signal; and selection means for selectively outputting the pseudo ECL output of said level conversion means or an output in accordance with 100 Base TX of said transmission line driving circuit to said optical transceiver based on a selection signal supplied by said transmission line driving circuit.

5. The interface device of claim 4, wherein said level conversion means includes a transmission level converting circuit and a reception level converting circuit, wherein said transmission level converting circuit includes:
a first and second inverting amplifier receiving a signal from said transmission line driving circuit and outputting the pseudo ECL signal to said optical transceiver; and wherein said reception level converting circuit includes:
a third and fourth inverting amplifier receiving the pseudo ECL signal from said optical receiver and providing a signal to said transmission line driving circuit via a low pass filter.

6. An interface device for establishing a physical interface between an optical fiber transmission line and a transmission line driving circuit, said device comprising:

an optical transceiver connected to said optical fiber transmission line, said optical transceiver having an electrical interface for a pseudo ECL signal, and a level conversion means for converting signal levels from said transmission line driving circuit to signal levels for an input of said optical transceiver and for converting signal levels output from said optical transceiver to signal levels for said transmission line driving circuit, said level conversion means including:
a transmission level converting circuit for converting an output signal level of said transmission line driving circuit to a pseudo ECL signal level of said optical transceiver, wherein said transmission level converting circuit includes:
a first and a second inverting amplifier receiving a signal from said transmission line driving circuit and outputting the pseudo ECL signal to said optical transceiver; and
a reception level converting circuit for converting the pseudo ECL signal output level of said optical transceiver into an input signal level of said transmission line driving circuit wherein said reception level converting circuit includes:
a third and a fourth inverting amplifier receiving the pseudo ECL signal from said optical transceiver and providing a signal to said transmission line driving circuit via a low pass filter.

7. The interface device of claim 6, wherein said first inverting amplifier includes a first operational amplifier and a first resistor connected between an output of said first operational amplifier and an inverting input of said first operational amplifier;

said second inverting amplifier includes a second operational amplifier and a second resistor connected between an output of said second operational amplifier and an inverting input of said second operational amplifier, wherein the inverting inputs of each of said first and second operational amplifiers also receive a differential output from said transmission line driving circuit, and non-inverting inputs of each of said first and second operational amplifiers are connected via a first capacitor to ground;

said third inverting amplifier includes a third operational amplifier and a third resistor connected between an output of said third operational amplifier and an inverting input of said third operational amplifier;

said fourth inverting amplifier includes a fourth operational amplifier and a fourth resistor connected between an output of said fourth operational amplifier and an inverting input of said fourth operational amplifier, wherein the inverting inputs of each of said third and fourth operational amplifiers also receive a pseudo ECL signal of said optical transceiver and non-inverting inputs of each of said third and fourth operational amplifiers are grounded; and said low pass filter includes
a fifth resistor connected to the output of said third operational amplifier via a second capacitor;
a sixth resistor connected to the output of said fourth operational amplifier via a third capacitor, said fifth and sixth resistors also connected at a common node, and
a fourth capacitor connected with said fifth and sixth resistors at said common node and also connected to ground.

8. An interface device for establishing a physical interface for a local area network between an optical fiber transmission line and a transmission line driving circuit comprising:

an optical transceiver connected to said optical fiber transmission line; and a level conversion means for converting signal levels from said transmission line driving circuit to signal levels for an input of said optical transceiver and for converting signal levels output from said optical transceiver to signal levels for said transmission line driving circuit, and wherein said transmission line driving circuit comprises: an interface with a twisted pair optical transmission line in accordance with 10 Base T as defined in IEEE standard 802.3, wherein said optical transceiver has an interface of a TTL signal, and said level conversion means includes a transmission level converting circuit for converting a differential output voltage of different sign output voltages of said transmission line driving circuit into the TTL signal level and reception level converting circuit for converting the TTL signal output level of said optical transceiver into a differential output voltage of different sign output voltages of said transmission line driving circuit, and wherein said reception level converting circuit comprises:

an inverting amplifier receiving a TTL signal output from said optical transceiver; and a phase amplifier also receiving the TTL signal output from said optical transceiver, the outputs of said inverting amplifier and said phase amplifier providing a differential input signal for said transmission line driving circuit; and wherein said transmission level converting circuit comprises:

a subtractor for receiving a differential output signal of said transmission line driving circuit; and a low pass filter receiving the output of said subtractor to output the TTL signal to said optical transceiver.

9. The interface device of claim 8, wherein said subtractor circuit includes a first operational amplifier for receiving said differential signal, an output of said first operational amplifier connected with an inverting input of said first operational amplifier via a parallel connection of a first resistor and a first capacitor;

said low pass filter includes a second operational amplifier receiving the output of said first operational amplifier via a second resistor, an output of said second amplifier being connected with an inverting input of said second operational amplifier via a third capacitor and with a non-inverting input of said second operational amplifier via a third resistor;

said inverting amplifier includes a third operational amplifier receiving the TTL output of said optical transceiver through an inverting input via a fourth resistor, an output of said third operational amplifier connected to the inverting input of the third operation amplifier, a non-inverting input of said third operational amplifier connected to ground; and said phase amplifier includes a fourth operational amplifier also receiving the TTL output of said optical transceiver through a non-inverting input via a fifth resistor, an output of said fourth operational amplifier connected to an inverting input of said fourth operational amplifier via a sixth resistor, wherein the outputs of said third and fourth operational amplifiers provide said differential input to said transmission line driving circuit.

10. An interface device for establishing a physical interface for a local area network between an optical fiber transmission line and a transmission line driving circuit comprising:

an optical transceiver connected to said optical fiber transmission line; and a level conversion means for converting signal levels from said transmission line driving circuit to signal levels for an input of said optical transceiver and for converting signal levels output from said optical transceiver to signal levels for said transmission line driving circuit, and wherein said transmission line driving circuit comprises: an interface with a twisted pair optical transmission line in accordance with 10 Base T as defined in IEEE standard 802.3, wherein said optical transceiver has an interface of a pseudo ECL signal level and said level conversion means includes a transmission level converting circuit for converting a differential output voltage of different sign output voltages of said transmission line driving circuit into a pseudo ECL signal level and a reception level converting circuit for converting the pseudo ECL signal output level of said optical transceiver into a differential output voltage of different sign output voltages of said transmission line driving circuit, wherein said transmission level converting circuit includes:

a first and a second inverting amplifier receiving a signal from said transmission line driving circuit and outputting the pseudo ECL signal to said optical transceiver; and wherein said reception level converting circuit includes:

a third and a fourth inverting amplifier receiving the pseudo ECL signal from said optical transceiver and providing a signal to said transmission line driving circuit via a low pass filter.

11. The interface device of claim 10, wherein said first inverting amplifier includes a first operational amplifier and a first resistor connected between an output of said first operational amplifier and an inverting input of said first operational amplifier;

said second inverting amplifier includes a second operational amplifier and a second resistor connected between an output of said second operational amplifier and an inverting input of said second operational amplifier, wherein the inverting inputs of each of said first and second operational amplifiers also receive a differential output from said transmission line driving circuit, and non-inverting inputs of each of said first and second operational amplifiers are connected via a first capacitor to ground;

said third inverting amplifier includes a third operational amplifier and a third resistor connected between an output of said third operational amplifier and an inverting input of said third operational amplifier;

said fourth inverting amplifier includes a fourth operational amplifier and a fourth resistor connected between an output of said fourth operational amplifier and an inverting input of said fourth operational amplifier, wherein the inverting inputs of each of said third and fourth operational amplifiers also receive a pseudo ECL signal of said optical transceiver and non-inverting inputs of each of said third and fourth operational amplifiers are grounded; and said low pass filter includes a fifth resistor connected to the output of said third operational amplifier via a second capacitor;

a sixth resistor connected to the output of said fourth operational amplifier via a third capacitor, said fifth and sixth resistors also connected at a common node, and a fourth capacitor connected with said fifth and sixth resistors at said common node and also connected to ground.

* * * * *